(12) United States Patent
Nakamura et al.

(10) Patent No.: US 7,705,480 B2
(45) Date of Patent: Apr. 27, 2010

(54) FLUID POWER GENERATOR

(75) Inventors: Kazuyoshi Nakamura, Azumino (JP);
Kesatoshi Takeuchi, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 12/368,374

(22) Filed: Feb. 10, 2009

(65) Prior Publication Data
US 2009/0206602 A1    Aug. 20, 2009

(30) Foreign Application Priority Data
Feb. 15, 2008  (JP) .............................. 2008-034324

(51) Int. Cl.
*F03B 13/10* (2006.01)
(52) U.S. Cl. .............................. 290/43; 290/39; 290/54; 290/1 R; 290/1 E; 290/4 D
(58) Field of Classification Search .................... 290/43, 290/39, 54, 1 R, 1 E, 4 D
See application file for complete search history.

(56) References Cited
U.S. PATENT DOCUMENTS
7,378,750 B2 * 5/2008 Williams ...................... 290/43
7,492,054 B2 * 2/2009 Catlin ........................ 290/54
7,605,486 B2 * 10/2009 Bridwell ...................... 290/43

FOREIGN PATENT DOCUMENTS
JP    2001-298982    10/2001

* cited by examiner

*Primary Examiner*—T C Patel
*Assistant Examiner*—Iraj A Mohandesi
(74) *Attorney, Agent, or Firm*—Harness, Dickey & Pierce, P.L.C.

(57) ABSTRACT

The fluid power generator is provided. The fluid power generator includes: a first member that has multiple coils; a second member that is rotatable relative to the first member and that has multiple permanent magnets; a rotating member that is mechanically linked with either one of the first member and the second member to rotate by fluid force; and a clearance controller that moves at least one of the first member and the second member to thereby change a clearance between the first member and the second member, wherein the clearance controller changes the clearance in such a manner as to make the clearance smaller after a start of rotation of the rotating member than before the start of rotation of the rotating member.

5 Claims, 6 Drawing Sheets

FLUID POWER GENERATOR

CROSS-REFERENCE TO RELATED APPLICATIONS

The present application claims the priority based on Japanese Patent Application No. 2008-34324 filed on Feb. 15, 2008, the disclosure of which is hereby incorporated by reference in its entirety.

BACKGROUND OF THE INVENTION

1. Field of the Invention

The present invention relates to control of a fluid power generator.

2. Description of the Related Art

For reduction of carbon dioxide, power generations by utilizing natural energies, such as wind power generation, hydraulic power generation, and photovoltaic power generation, have been attracting a great deal of attention. Enhancement of the efficiency of such natural energy power generations is of great importance to solve the environmental problems.

A fluid power generator may be constructed, for example, with a brushless motor structure. One example of the brushless motor structure is disclosed in JP 2001-298982A.

One typical example of the fluid power generator is a wind power generator. The wind power generator uses blades that receive the wind force to rotate. The blades are generally designed to have a large weight for the enhanced inertia of rotation. In the condition of low wind force, it is difficult to rotate the blades and start power generation. One proposed structure of the wind power generator uses a drive motor separate from the power generator to start rotation of the blades even in the condition of low wind force.

This prior art structure, however, requires the separate drive motor for starting the power generator. This undesirably complicates the overall mechanism and increases the manufacturing cost. Such drawbacks are not characteristic of the wind power generator but are commonly found in various fluid power generators.

SUMMARY

An object of the present invention is to provide technology that is able to ensure a start of power generation even in the condition of low flow rate.

According to an aspect of the present invention, a fluid power generator is provided. The fluid power generator comprises: a first member that has multiple coils; a second member that is rotatable relative to the first member and that has multiple permanent magnets; a rotating member that is mechanically linked with either one of the first member and the second member to rotate by fluid force; and a clearance controller that moves at least one of the first member and the second member to thereby change a clearance between the first member and the second member, wherein the clearance controller changes the clearance in such a manner as to make the clearance smaller after a start of rotation of the rotating member than before the start of rotation of the rotating member.

According to this configuration, there is a large clearance before a start of rotation of the rotating member. This arrangement decreases the load at a start of rotation of the rotating member and thus ensures a start of power generation even in the condition of low flow rate.

The technique of the invention is not restricted to the power generator having any of the above arrangements but is also actualized by diversity of other applications, for example, a power generation method, a power generation system, integrated circuits for attaining the functions of the power generation method and the power generation system, computer programs for the same purpose, and recording media in which such computer programs are recorded.

DESCRIPTION OF THE PREFERRED EMBODIMENT

Next, aspects of the present invention will be described in the following order on the basis of embodiments:

A. First Embodiment:

B. Second Embodiment:

C. Modified Examples:

A. First Embodiment

Figure 1A:
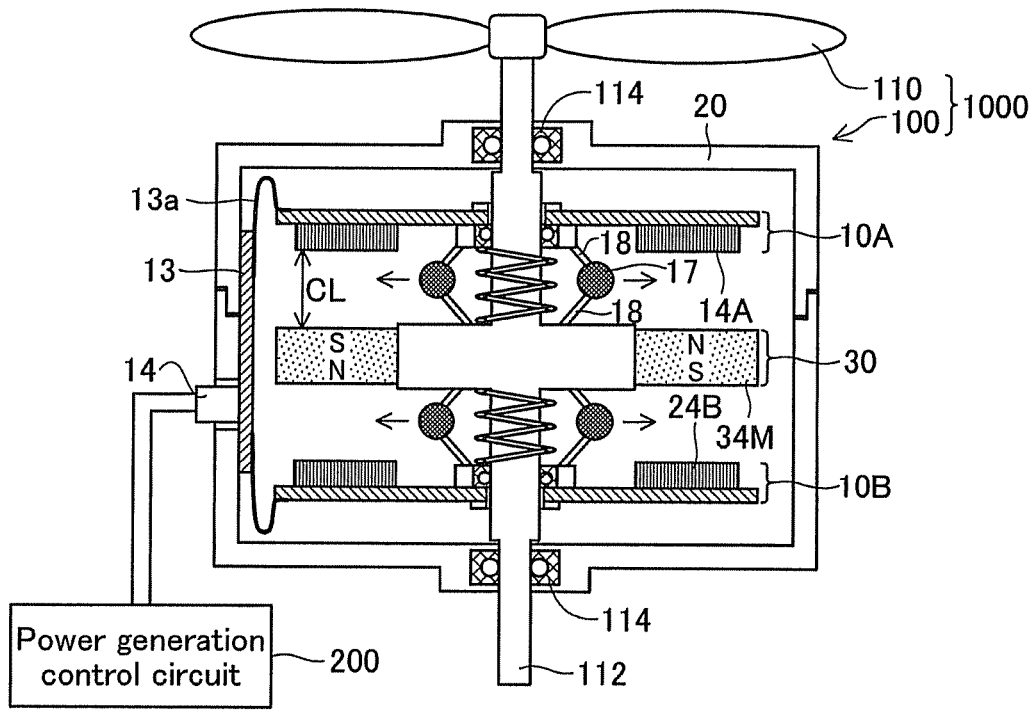
FIGS. 1A and 1B are sectional views illustrating the schematic configuration of a wind power generator 1000 in one embodiment of the invention.
Figure 1B:
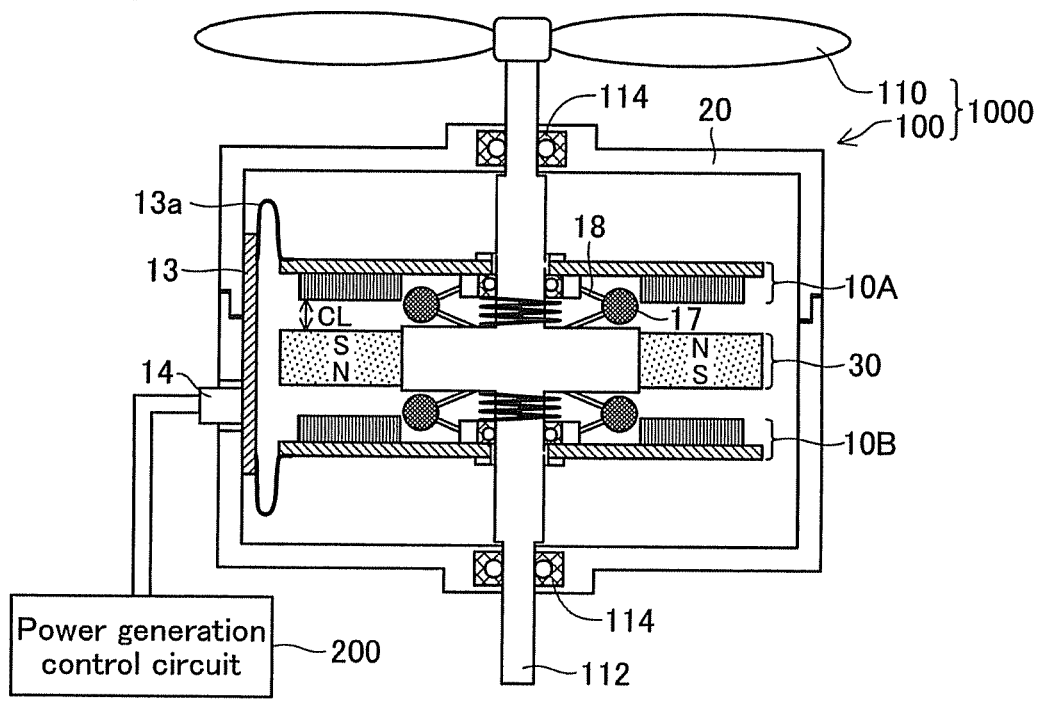

FIGS. 1A and 1B are sectional views illustrating the schematic configuration of a wind power generator 1000 in one embodiment of the invention. FIG. 1A shows the state of the wind power generator 1000 in a low wind force condition, and FIG. 1B shows the state of the wind power generator 1000 in a high wind force condition. The wind power generator 1000 includes a main body assembly 100, blades 110, and a power generation control circuit 200. The blades 110 are rotated by wind force to rotate a rotating shaft 112 of the main body assembly 100. The main body assembly 100 has a rotor 30, an A-phase stator 10A, a B-phase stator 10B, and a casing 20. A bearing 114 is provided at a joint of the rotating shaft 112 with the casing 20. The rotor 30 is fastened to the rotating shaft 112 and rotates with rotation of the rotating shaft 112. The rotor 30 is a substantially disk-shaped member about the rotating shaft 112 and has a magnet array 34M of multiple permanent magnets. The magnet array 34M is magnetized in a vertical direction. The A-phase coil 10A and the B-phase coil 10B are substantially disk-shaped members and have coil arrays 14A and 24B formed on respective faces opposed to the rotor 30. The coil arrays 14A and 24B generate induced voltage by rotation of the rotor 30. The electric current generated by the coil arrays 14A and 24B runs through a cable 13a to a circuit board 13 and is supplied to the power generation control circuit 200 via a connector 14. The generated electric current is subjected to rectification, smoothing, and control by the power generation control circuit 200. The generated electric current is then accumulated in an accumulator (not shown).

Weights 17 and rods 18 are provided between the rotor 30 and the A-phase stator 10A as well as between the rotor 30 and the B-phase stator 10B. The weights 17 are linked to the rotor 30 by means of the rods 18. With rotation of the rotor 30 induced by rotation of the blades 110, the weights 17 rotate about the rotating shaft 112. The rotation of the blades 110 applies the centrifugal force onto the weights 17, so that the weights 17 start moving outward from the rotating shaft 112. As the weights 17 move outward from the rotating shaft 112, the two stators 10A and 10B are drawn by the rods 18 to be closer to the rotor 30 (see FIG. 1B). This results in decreasing a clearance CL between the rotor 30 and the stator 10A and a clearance CL between the rotor 30 and the stator 10B.

Springs 19 are provided between the rotor 30 and the A-phase stator 10A as well as between the rotor 30 and the B-phase stator 10B. As the rotation speed of the blades 110 decreases to reduce the centrifugal force applied onto the weights 17, the springs 19 work to respectively move the A-phase stator 10A and the B-phase stator 10B away from the rotor 30 and thereby increase the respective clearances CL.

Figure 2A:
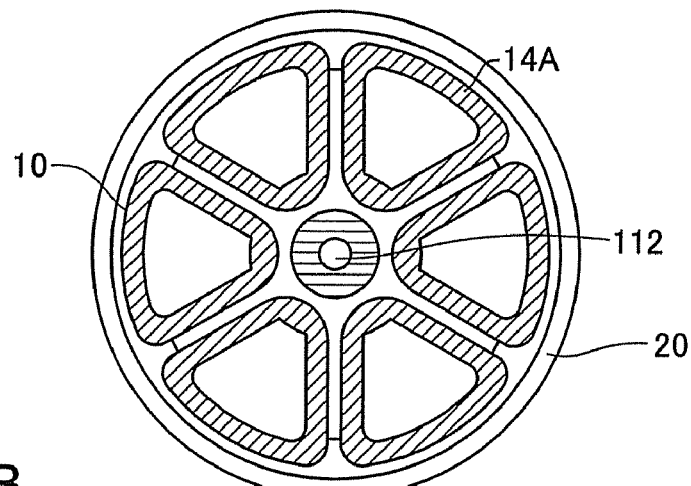
FIGS. 2A to 2C are an explanatory views showing the structures of the rotor 30 and the two stators 10A and 10B.
Figure 2B:
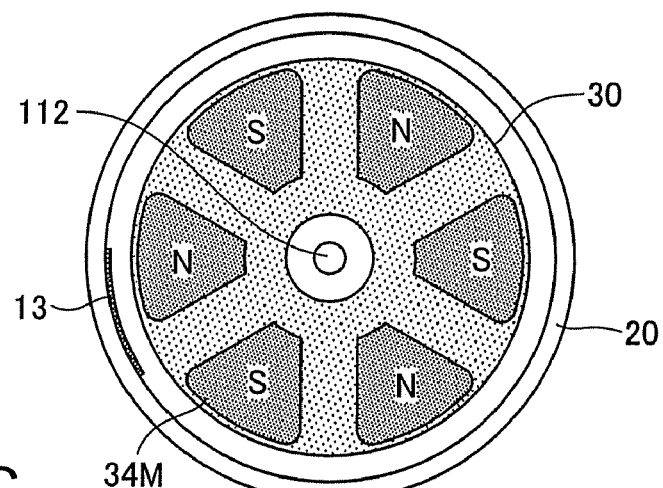
Figure 2C:
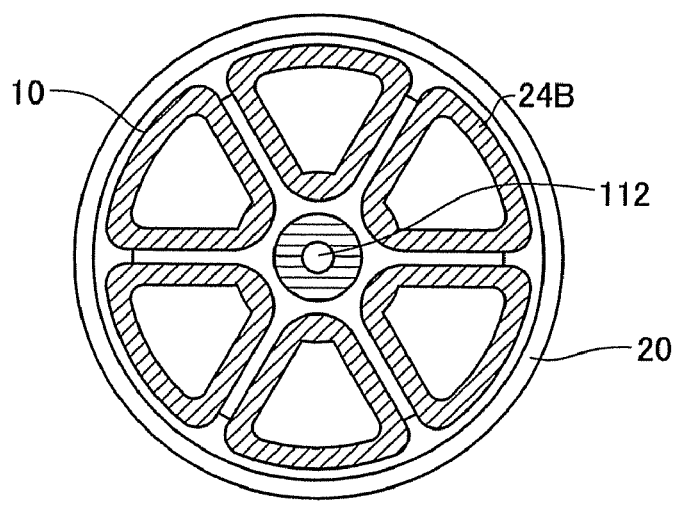

FIGS. 2A to 2C are an explanatory views showing the structures of the rotor 30 and the two stators 10A and 10B. In this illustrated example, the A phase-coil array 14A and the B-phase coil array 24B respectively have six coils, while the magnet array 34M has six permanent magnets. The number of the coils in each coil array and the number of the magnets in the magnet array are, however, not restricted to this number but may be set arbitrarily.

Figure 3:
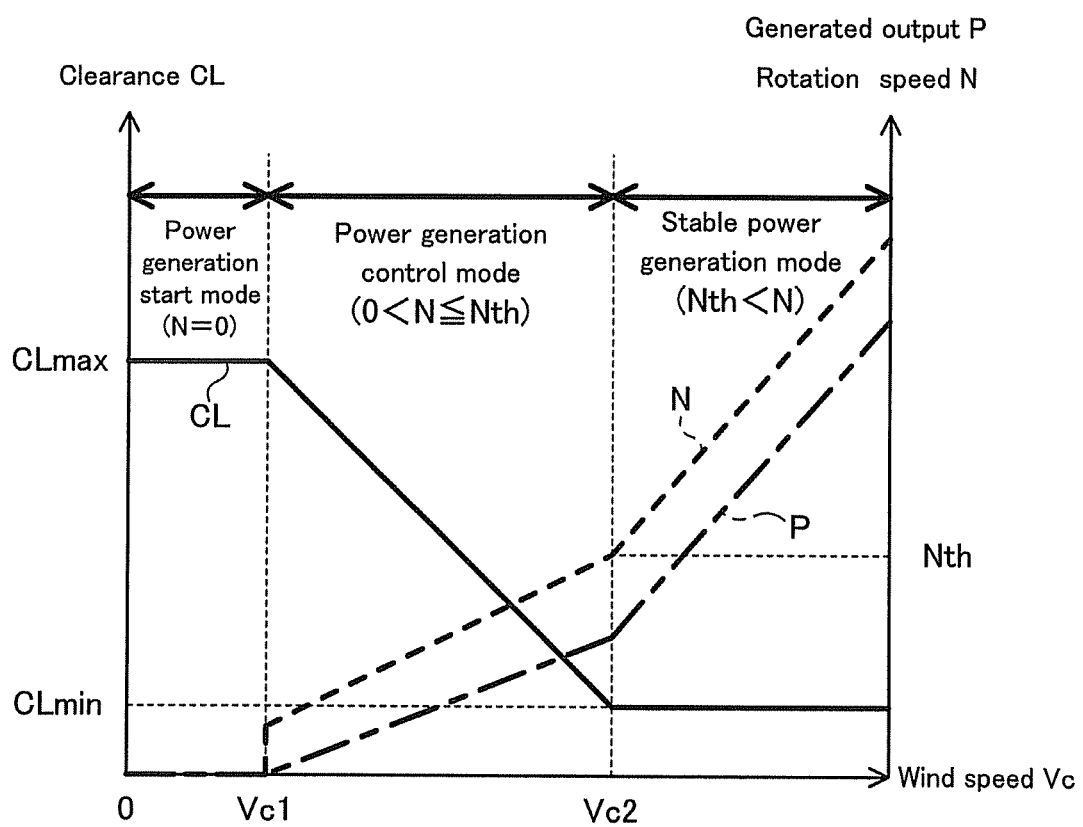
FIG. 3 is a graph showing a variation in clearance CL against wind speed Vc, together with a variation in rotation speed N of the blades 110 and a variation in generated output P.

FIG. 3 is a graph showing a variation in clearance CL against wind speed Vc, together with a variation in rotation speed N of the blades 110 and a variation in generated output P. These variations CL, N, and P are drawn as linear lines in the graph of FIG. 3 for the simplicity of explanation and may be curved lines in the actual state. This is also applied to the graph of FIG. 6 discussed later. The wind power generator 1000 has three options of operation mode according to the rotation speed N of the blades 110, 'power generation start mode', 'power generation control mode', and 'stable power generation mode'.

When the wind speed Vc is in a range of 0 to Vc1, the blades 110 are not rotated to have the rotation speed N equal to 0. This activates the power generation start mode. In the power generation start mode, the weights 17 receive no centrifugal force, so that the clearance CL is set to a maximum clearance CLmax. The maximum clearance CLmax results in the minimum intensity of a magnetic field produced by the magnet array 34M and applied to the coil arrays 14A and 24B. The coil arrays 14A and 24B accordingly generate only small electric power but have lowest rotational load. In the power generation start mode, because of the lowest rotational load, the rotation of the blades 110 is readily started even at the low wind speed Vc.

The rotation speed N of the blades 110 gradually increases with an increase in wind speed Vc over Vc1 and reaches a stable rotation speed Nth at the wind speed Vc to Vc2. The 'stable rotation speed Nth' represents the rotation speed N of the blade 110 at the clearance CL equal to a minimum clearance CLmin. The minimum clearance CLmin is a minimum possible value of the clearance CL in the structure of the main body assembly 100 (see FIG. 1B). At the rotation speed N of higher than 0 but not higher than the stable rotation speed Nth, the operation mode shifts to the power generation control mode. In the power generation control mode, as the blades 110 receive the wind of the wind speed Vc1 and start rotation, the centrifugal force is applied to the weights 17 to gradually decrease the clearance CL. The gradual decrease of the clearance CL with an increase in rotation speed N gradually increases the intensity of the magnetic field produced by the magnet array 34M and applied to the coil arrays 14A and 24B. Namely the rotational load increases with an increase in rotation speed N in the power generation control mode. This enhances the power generation efficiency per rotation speed. As mentioned above, when the blades 110 receive the wind of the wind speed Vc2 and their rotation speed N reaches the stable rotation speed Nth, the clearance CL is decreases to the minimum clearance CLmin. Even when the rotation speed N of the blades 110 exceeds the stable rotation speed Nth, the structure of the main body assembly 100 (FIG. 1B) restricts the clearance CL to the minimum clearance CLmin.

In the power generation control mode, with a decrease in wind speed Vc, the centrifugal force applied to the weights 17 is reduced, and the clearance CL is increased by the force of the spring 19. The increased clearance CL results in decreasing the intensity of the magnetic field produced by the magnet array 34M and applied to the coil arrays 14A and 24B. In the power generation control mode, even when the rotation speed N is decreased with a decrease in wind speed Vc, the reduced rotational load allows the blades 110 to keep their rotation. Namely even in the event of a variation in wind speed Vc, the clearance changes according to the rotation speed N to vary the rotational load, thus ensuring continuation of power generation.

The operation mode shifts to the stable power generation mode when the wind speed Vc increases to or over Vc2 and the rotation speed N of the blades 110 exceeds the stable rotation speed Nth. In the stable power generation mode, the clearance CL is fixed to the minimum clearance CLmin and gives the highest rotational load. In the stable power generation mode, the load of power generation may be changed for efficient power generation by the power generation control circuit 200 connecting with the connector 14 (see FIG. 1A) in a certain range of the rotation speed N that is not lower than the stable rotation speed Nth. The graph of FIG. 3 shows the rotation speed N under the condition of a fixed power generation load.

In the wind power generator 1000 of the first embodiment, the clearance CL is set to the maximum clearance CLmax until the rotation of the blades 110 is started, so as to minimize the rotational load applied onto the blades 110. This arrangement ensures a start of power generation even in the condition of low flow rate.

B. Second Embodiment

Figure 4:
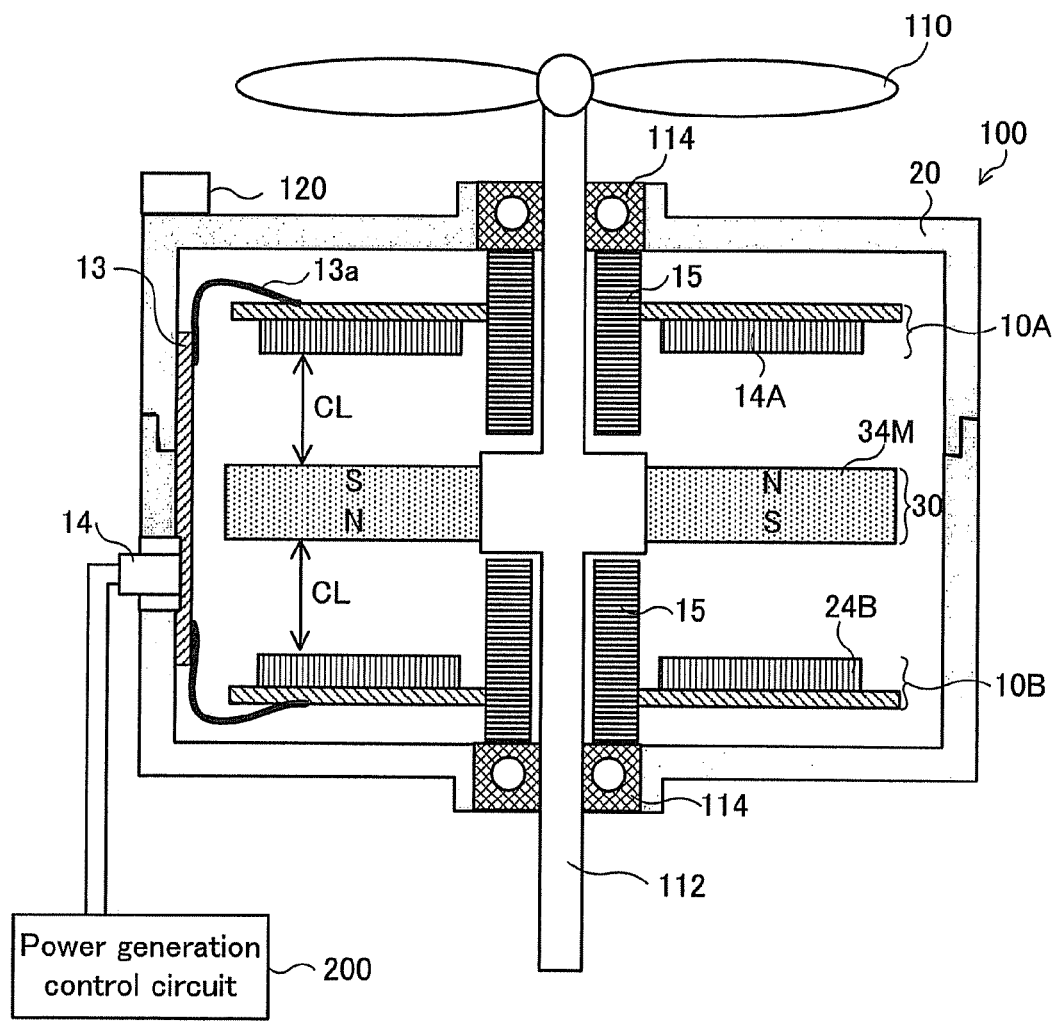
FIG. 4 illustrates the schematic structure of a wind power generator 1000b in a second embodiment of the invention.

FIG. 4 illustrates the schematic structure of a wind power generator 1000b in a second embodiment of the invention. The differences of the second embodiment from the first embodiment are a wind gauge 120, actuators 15 provided in place of the weights 17 and the springs 19, and selection of the operation mode according to the wind speed Vc instead of the rotation speed N. Otherwise the wind power generator 1000b of the second embodiment has the same structure as that of the wind power generator 1000 of the first embodiment.

The wind gauge 120 is used to measure the wind speed Vc. The actuators 15 move the stators 10A and 10B in the vertical direction according to the wind speed Vc measured by the wind gauge 120 to change the clearances CL.

Figure 5:
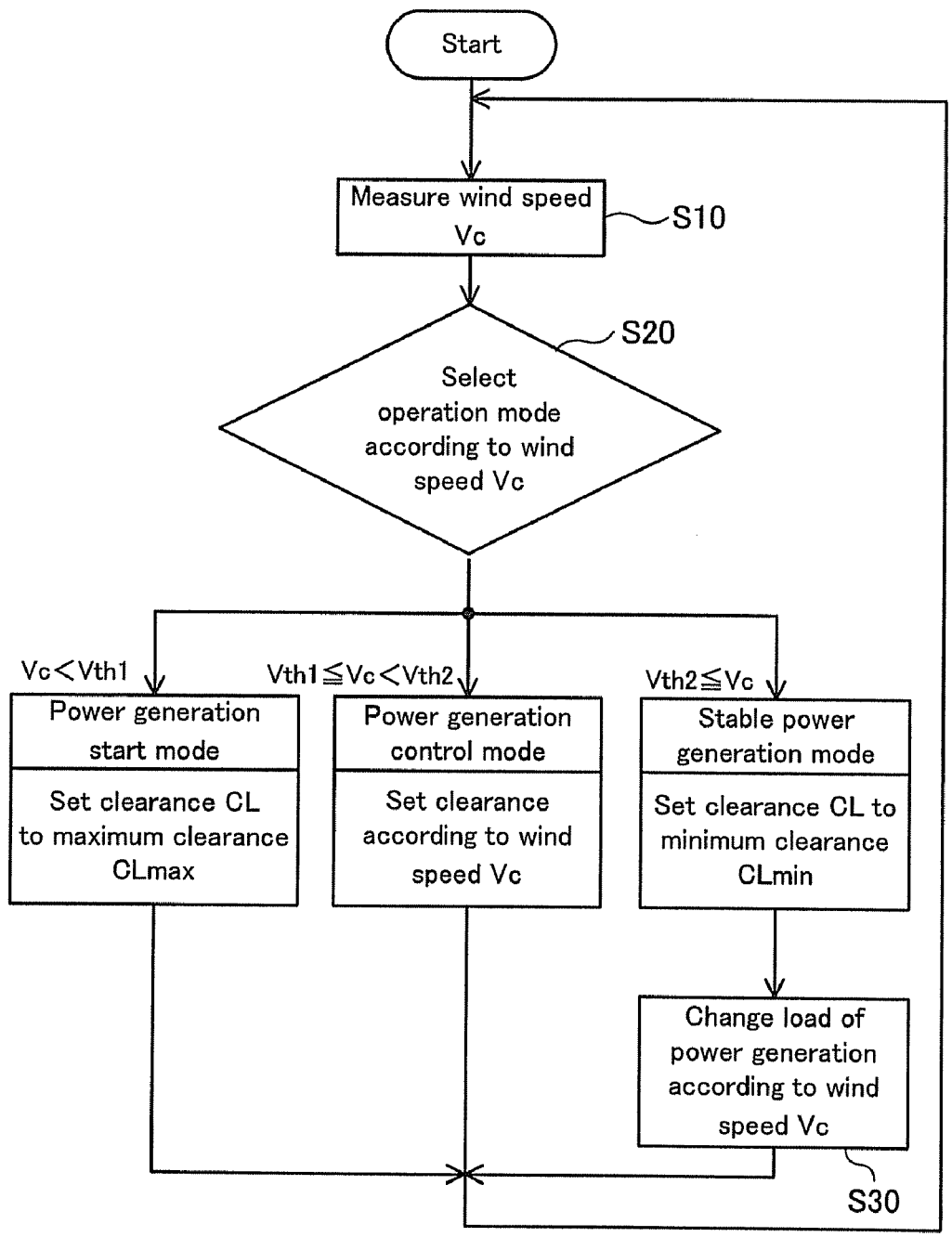
FIG. 5 is a flowchart showing a control method of the wind power generator 1000b.

FIG. 5 is a flowchart showing a control method of the wind power generator 1000b. At step S10, the wind speed Vc is measured by the wind gauge 120. At step S20, the actuator 15 compares the observed wind speed Vc with two reference wind speeds Vth1 and Vth2 and selects one of the three options discussed above as the operation mode based on the result of the comparison. The two reference wind speeds Vth1 and Vth2 satisfy a relation of Vth1<Vth2.

If the wind speed Vc is lower than the first reference wind speed Vth1, the power generation start mode is selected as the operation mode, and the clearance CL is set to the maximum clearance CLmax. This arrangement ensures a start of power generation even in the condition of the low wind speed Vc.

If the wind speed Vc is not lower than the first reference wind speed Vth1 but lower than the second reference wind speed Vth2, the power generation control mode is selected as the operation mode, and the clearance CL is set according to the wind speed Vc. The clearance CL is changed responsive to variation of the wind speed Vc to vary the rotational load. This arrangement desirably enhances the power generation efficiency and ensures continuation of power generation even in the state of the decreased wind speed Vc.

If the wind speed Vc is not lower than the second reference wind speed Vth2, the stable power generation mode is selected as the operation mode, and the clearance CL is set to the minimum clearance CLmin. In the stable power generation mode, the load of power generation is changed according to the wind speed Vc at step S30. This further enhances the power generation efficiency.

After setting the clearance CL in the selected operation mode, the control method goes back to step S10 to measure the wind speed Vc and to step S20 to select the operation mode. The processing of step S30 may be omitted when not required.

Figure 6:
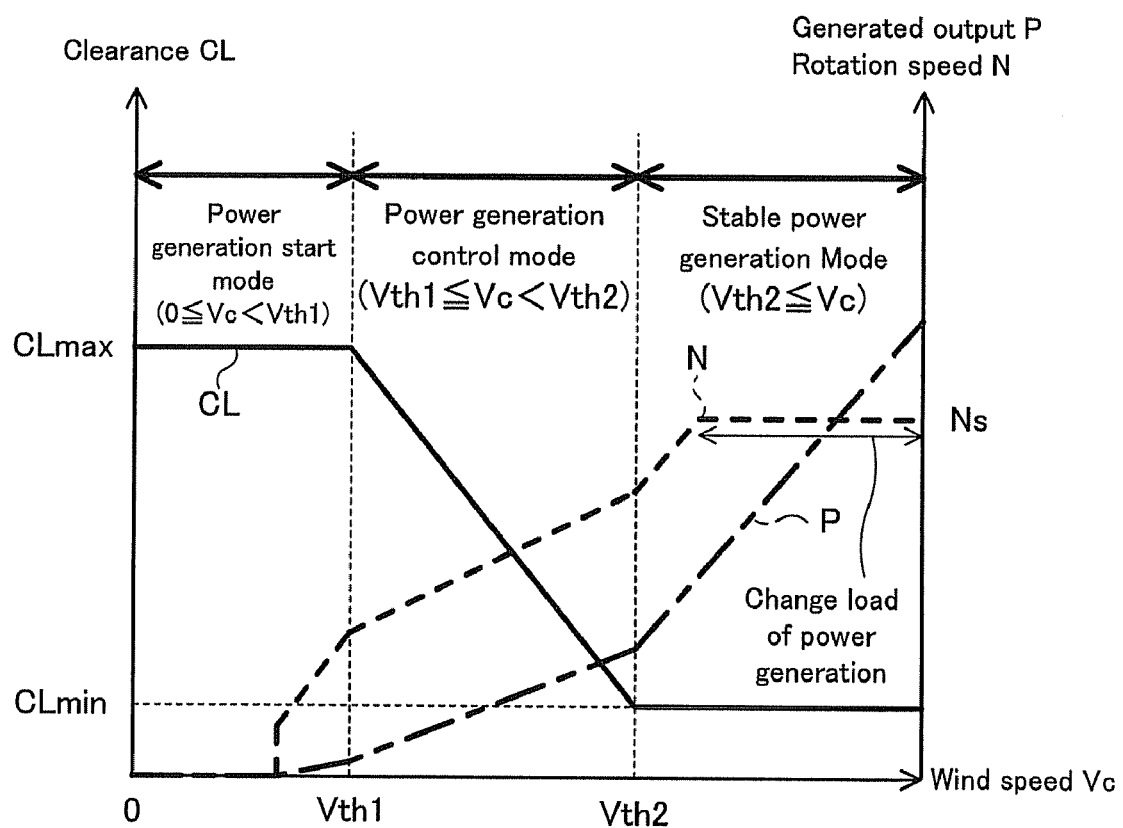
FIG. 6 is a graph showing a variation in clearance CL against the wind speed Vc.

FIG. 6 is a graph showing a variation in clearance CL against the wind speed Vc. In the graph of FIG. 6, the power generation start mode is selected as the operation mode until an increase of the wind speed Vc to or over the first reference wind speed Vth1 even at the rotation speed N exceeding 0. Such setting of the first reference wind speed Vth1 keeps the operation mode to the power generation start mode until stable rotation of the blades 110 with the stable wind force.

In the stable power generation mode, the power generation control circuit 200 changes the load of power generation, in order to keep the rotation speed N of the blades 110 to a preset rotation speed Ns. The rotation speed N is thus substantially fixed to the preset rotation speed Ns even in the state of the increased wind speed Vc.

The system of changing the clearance CL according to the wind speed Vc ensures a start of power generation even in the condition of the low wind speed Vc, as in the first embodiment.

C. Modified Examples

The embodiments discussed above are to be considered in all aspects as illustrative and not restrictive. There may be many modifications, changes, and alterations without departing from the scope or spirit of the main characteristics of the present invention. Some examples of possible modification are given below.

C1. Modified Example 1

In the embodiments discussed above, the clearance CL is changed according to either one of the rotation speed N and the wind speed Vc. The clearance CL may alternatively be changed according to both the rotation speed N and the wind speed Vc. The actuators 15 provided in the wind power generator 1000b of the second embodiment may be arranged to measure the rotation speed N of the blades 110 and change the clearance CL according to the observed rotation speed N.

C2. Modified Example 2

In the wind power generators 1000 and 1000b of the above embodiments, the stators 10A and 10B are moved in the vertical direction to change the clearances CL between the respective stators 10A and 10B and the rotor 30. The rotor 30 may be moved, instead of the stators 10A and 10B, in the vertical direction to change the clearances CL. Otherwise both the stators 10A and 10B and the rotor 30 may be moved in the vertical direction to change the clearances CL. Any of these techniques is adoptable to ensure relative motion of the stators 10A and 10B to the rotor 30.

C3. Modified Example 3

In the wind power generators 1000 and 1000b of the above embodiments, the member (rotor 30) equipped with the magnet array 34M is linked with the blades 110. The members (stators 10A and 10B) equipped with the coil arrays 14A and 24B may alternatively be linked with the blades 110.

C4. Modified Example 4

The above embodiments describe application of the invention to the wind power generators 1000 and 1000b. The technique of the invention is, however, not restricted to such wind power generators but may be applied to various fluid power generators, such as a water power generator.

C5. Modified Example 5

In the wind power generators 1000 and 1000b of the above embodiments, the main body assembly 100 has the two phase coil arrays 14A and 24B. The coils arrays are, however, not restricted to the two phases but the main body assembly 100 may have only one phase coil array or three or greater number of phase coil arrays.

C6. Modified Example 6

In the wind power generators 1000 and 1000b of the above embodiments, the power generation control circuit 200 changes the load of power generation in the stable power generation mode. The load of power generation may also be changed according to the wind speed Vc or according to the rotation speed N in the power generation control mode. For example, in the power generation control mode, as the clearance CL increases with a decrease in wind speed Vc or a decrease in rotation speed N, the intensity of the magnetic field produced by the magnet array 34M and applied to the coil arrays 14A and 24B is lowered to decrease the generated output P. The power generation control circuit 200 controls the amount of generated current according to the decrease of the generated output P, thus decreasing the load of power generation. The decreasing load of power generation increases the rotation speed N of the blades 100 in the wind power generator 1000 or 1000b. In the power generation control mode, the control procedure may change the load of power generation with the control of the clearance CL to ensure adequate power generation according to the wind speed Vc or the rotation speed N.

What is claimed is:

1. A fluid power generator, comprising:
a first member that has multiple coils;

a second member that is rotatable relative to the first member and that has multiple permanent magnets;

a rotating member that is mechanically linked with either one of the first member and the second member to rotate by fluid force; and a clearance controller that moves at least one of the first member and the second member to thereby change a clearance between the first member and the second member, wherein the clearance controller changes the clearance in such a manner as to make the clearance smaller after a start of rotation of the rotating member than before the start of rotation of the rotating member.

2. The fluid power generator according to claim 1, wherein the clearance controller changes the clearance according to a rotation speed of the rotating member.

3. The fluid power generator according to claim 2, wherein the clearance controller (i) sets the clearance to a specified first value when the rotation speed is not higher than a first reference rotation speed;

(ii) sets the clearance to a specified second value, which is smaller than the first value, when the rotation speed exceeds a second reference rotation speed, which is higher than the first reference rotation speed; and (iii) decreases the clearance with an increase in rotation speed when the rotation speed is between the first reference rotation speed and the second reference rotation speed.

4. The fluid power generator according to claim 1, further comprising:

a flow rate detector that measures a flow rate of the fluid, wherein the clearance controller changes the clearance according to the flow rate measured by the flow rate detector.

5. The fluid power generator according to claim 4, wherein the clearance controller (i) sets the clearance to a specified first value when the flow rate is not higher than a first reference flow rate;

(ii) sets the clearance to a specified second value, which is smaller than the first value, when the flow rate exceeds a second reference flow rate, which is higher than the first reference flow rate; and (iii) decreases the clearance with an increase in flow rate when the flow rate is between the first reference flow rate and the second reference flow rate.

* * * * *